United States Patent Office 3,374,188
Patented Mar. 19, 1968

3,374,188
PREPARATION OF EXPANDED
CELLULAR PRODUCTS
Frank Dennis Marsh, Wilmington, Del., and Donald Nixon Thatcher, Pitman, N.J., assignors to E. I. du Pont de Nemours and Company, Wilmington, Del., a corporation of Delaware
No Drawing. Filed Sept. 14, 1965, Ser. No. 487,311
4 Claims. (Cl. 260—2.5)

ABSTRACT OF THE DISCLOSURE

The process for preparing expanded cellular products comprising intimately mixing an amount of ammonium 5-azidotetrazole as a blowing agent with an organic polymer composition and heating to decompose the blowing agent.

---

This application relates to the preparation of cellular compositions from elastomers and other polymeric materials; more particularly it relates to the expansion of these elastomers and polymeric materials into cellular products by the use of the ammonium salt of 5-azidotetrazole (ammonium 5-azidotetrazole, abbreviated AAT).

Various compounds are known which, because they decompose at elevated temperatures to yield large amounts of gas, are effective in the preparation of cellular compositions from polymeric materials. Such agents are commonly called "blowing agents." Most of the known blowing agents suffer from at least one shortcoming, such as cost or an adverse effect on the properties of the foams prepared from them. There is a need, therefore, for additional blowing agents which will be useful in the preparation of cellular products from polymeric materials.

It has now been found that high quality expanded cellular products may be prepared with a minimum of blowing agent by intimately mixing with an organic polymer composition an amount of ammonium 5-azidotetrazole as a blowing agent, and then heating to decompose the blowing agent. The amount of ammonium 5-azidotetrazole ordinarily required consists of about 1 to 50 parts by weight per 100 parts of unexpanded polymeric material.

Ammonium 5-azidotetrazole is a known compound. Its preparation was disclosed in Liebig's Annalen, volume 287, page 239 (1895). Its structure may be represented as follows:

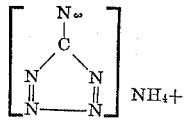

A method of preparing the sodium salt of 5-azidotetrazole is disclosed in U.S. Patent 2,179,783. The ammonium salt may be prepared from the sodium salt using conventional techniques.

A representative synthesis of ammonium 5-azidotetrazole is as follows:

To 162.5 g. of sodium azide (2.5 moles) dissolved in 415 ml. of water and cooled in an ice bath is added 132.5 g. of cyanogen bromide (1.25 moles) at such a rate as to maintain the temperature below 5° C. When the addition is complete, the mixture is brought to 25° C. and stirred at this temperature for 15 minutes. The mixture is extracted with ether to remove any excess cyanogen bromide. A 75-ml. aliquot of the reaction mixture is acidified with 10.5 ml. of concentrated hydrochloric acid and extracted with ether. The ammonium salt is formed by the addition of anhydrous ammonia to the dried ether extract. 15.78 grams of ammonium 5-azidotetrazole is obtained, which is a 98.5% yield based on sodium azide.

Ammonium azidotetrazole is outstanding with respect to the amount of gas which it yields when heated beyond its decomposition temperature. A half-gram sample in 100 ml. of heavy mineral oil ("Nujol") gives 380 ml. of gas at 155–170° C. (760 ml. of gas per gram). In contrast to this, azodicarbonamide, a well-known blowing agent, is reported to give 225 ml. per gram when decomposed in dioctyl phthalate at 230° C., (U.S. Rubber Chemicals Bulletin C-101). Dinitrosopentamethylenetetramine, another commercially available blowing agent, is reported to give 225–245 ml. of gas per gram when decomposed in standard tests (see bulletin entitled "Du Pont Unicel ND Chemical Blowing Agent," issued by the Explosives Department of the E. I. du Pont de Nemours and Co.).

Ammonium 5-azidotetrazole may be used as the blowing agent in any of the polymeric materials conventionally used in forming cellular products. These materials may be elastomeric or plastic in nature. Commonly expanded plastic materials are phenol-aldehyde resins, urea-aldehyde resins, polystyrene, polyethylene, polyurethane plastics, platicized poly(vinyl chloride), cellulose acetate, polyesters, and polyamides. Examples of elastomers commonly expanded include natural rubber and synthetic elastomers such as homopolymers and copolymers of conjugated diolefinic compounds such as chloroprene, isoprene, and butadiene (including butadiene-styrene copolymers, butadiene acrylonitrile copolymers and copolymers of isobutylene with isoprene), chlorosulfonated polyethylene, copolymers of fluorine-containing olefinic compounds, ethylene-propylene copolymer elastomers, and polyurethane rubbers.

The amount of the blowing agent to be used will depend on such considerations as the particular polymer involved and the density of foam desired. In general, one to 15 parts of the blowing agent may be used per about 100 parts of elastomeric polymers. In plastics and resins or in mixtures of rubbery polymers with plastics or resins, the amount of the blowing agent may vary from 2 to 50 parts per 100 parts of the polymeric material.

In general, the techniques applicable in preparing cellular products using ammonium 5-azidotetrazole are similar to the techniques used with conventional solid blowing agents in which heat is applied to decompose the agent and form the inflating gas. These methods are well-known to those skilled in the particular technology involved, and may be routinely modified to obtain best results for a given polymeric material to be expanded and a desirable final cellular product. Generally the blowing agent, along with other conventional additives, is intimately mixed with the polymeric composition to be expanded and then sufficient heat is applied to decompose the ammonium azidotetrazole. The ammonium azidotetrazole ordinarily decomposes in the range of 155–170° C., however its decomposition temperature may be lowered to about 140–155° C. by addition of a suitable "activator". Urea is a particularly suitable activator, especially in preparing sponges from chloroprene polymers. An amount of urea ranging from about 1 to about 5 parts by weight per part of ammonium 5-azidotetrazole may be used.

The actual organic polymer compositions which are expanded by the blowing agent may be either in a dry-solid form, in a solvent solution, or in the form of a liquid polymer precursor. In the latter case the ammonium azidotetrazole is introduced directly into the liquid precursor; heat is then applied causing the blowing agent to decompose and expand the further polymerized material as it is formed from the precursor.

Inasmuch as the ammonium azidotetrazole is somewhat explosive under some conditions, it is ordinarily diluted by an inert material, such as a hydrocarbon oil or silica flour before it is added to the polymeric composition to be expanded.

A surface active agent may be used to improve the dispersibility of the blowing agent in the polymeric material. The surface active agent may be added to the blowing agent in advance or it may be incorporated with the other ingredients on the mill. An example of a particularly suitable surface active agent is C-cetylbetaine [(1-carboxyheptadecyl)trimethylammonium inner salt].

The following publications contain representative disclosures of established techniques involved in forming cellular products from polymeric materials. This list, of course, gives only a sampling of pertinent references. Numerous other references could be cited.

Morton, Introduction to Rubber Technology, 1959, pp. 436–440. (Expansion of a dry styrene-butadiene copolymer to a sponge product.)

Golding, Polymers and Resins, 1959, pp. 642–647.

Publications of the E. I. du Pont de Nemours and Co., Elastomers Chemicals Dept.:

BL–264, "Neoprene Cellular Soles," Aug. 30, 1954.
BL–357, "Continuous Vulcanization of Neoprene Extrusions in Liquid Curing Media," August 1959, p. 10.
"Hypalon" Report No. 8, "Cellular Hypalon," November 1962.
"Hypalon" Report No. 12, "Extruded Air-Cured Cellular Hypalon," December 1963.
"Viton" Bulletin, "Viton Sponge," Oct. 10, 1961.
"Adiprene" Urethane Rubber Bulletin, "Microcellular 'Adiprene' L Vulcanizates Blown with 'Nitrosan'," Jan. 21, 1964. (Process in which the blowing agent is added to a liquid polymer precursor.)
"A Technical Report on 'Nordel' Hydrocarbon Rubber," April 1964 p. 70.

The following examples will better illustrate the nature of the present invention; however, the invention is not intended to be limited to these examples. Parts are by weight unless otherwise indicated.

*Example 1*

The use of ammonium 5-azidotetrazole as a blowing agent in the formation of a sponge product from a polychloroprene elastomer is illustrated as follows:

Two samples (A and B) are prepared both of which are composed of the following ingredients compounded on a rubber mill.

| | Parts by weight |
|---|---|
| Polychloroprene (prepared essentially as described in Example 1 of U.S. Patent 2,914,497) | 100 |
| Magnesia | 4 |
| Mixture of 65% N-phenyl-1-naphthylamine and 35% N,N'-diphenyl-p-phenylenediamine, masticated with equal parts by weight of the polychloroprene to improve dispersibility of the antioxidant | 4 |
| Medium thermal carbon black | 20 |
| Whiting (calcium carbonate) | 80 |
| Petrolatum | 3 |
| Light petroleum oil | 15 |
| Zinc oxide | 5 |
| 2-mercapto-2-imidazoline | 0.6 |
| Tetramethyl thiuram disulfide | 0.7 |
| Urea activator [1] | 4.2 |
| C-cetylbetaine (25–30% active ingredient) | 1.8 |
| Ammonium azidotetrazole (AAT), as indicated in Table I. | |

[1] A surface coated urea sold as B-I-K by the U.S. Rubber Company. It has a specific gravity of 1.32 and a melting point of 129–134°.

The blowing agent, which is intimately mixed with the other ingredients in the milling process, is used in a diluted form, either as a slurry with heavy mineral oil, or as a mixture with finely divided silica. The quantity of ammonium 5-azidotetrazole as well as the nature and amount of diluent in each experiment is shown in Table I.

After the mixing process, the compounded stocks are cured in a mold under pressure at 153° C. for 9 minutes. The partially cured samples are removed from the mold and heated in an oven for 20 minutes at 153° C.

Table I shows the heights and densities of the sponge samples obtained.

TABLE I

| Component | Sample A | Sample B |
|---|---|---|
| Ammonium 5-az dotetrazole | 1 | 2.4 |
| Silica flour | 5 | |
| Mineral oil | | 0.8 |
| Height of foam, in | 0.414 | 0.630 |
| Density, g./cc | 0.518 | 0.241 |

*Example 2*

Utilization of ammonium 5-azidotetrazole [1] as a blowing agent in the preparation of a sponge product from a styrene-butadiene copolymer is shown as follows:

A compounded styrene-butadiene sample is prepared from the following ingredients.

| | Parts by weight |
|---|---|
| Butadiene-styrene copolymer (contains 23.5% bound styrene, Mooney viscosity, ML–14, 50–52, and a specific gravity of 0.94) | 100 |
| Butadiene-styrene copolymer containing 82.5% bound styrene, Mooney viscosity, ML–4, Tire & Rubber Co.) | 15 |
| Zinc oxide | 5 |
| Steric acid | 1.5 |
| Whiting | 75 |
| Light petroleum oil | 15 |
| Titanium dioxide | 10 |
| Petrolatum | 2 |
| 2,6-di-tert-butyl-4-phenylphenol | 2 |
| Sulfur | 2.5 |
| Bis(2,6-dimethylmorpholinylthiocarbonyl) sulfide | 0.3 |
| Urea activator (96% urea coated with 4% calcium stearate) | 4.1 |
| Ammonium azidotetrazole | 2.7 |

A test sample is cured in a mold under pressure for 8 minutes at 153° C. The partially cured sample is then removed from the mold and cured in an oven for 4 hours at 121° C.

The sponge sample has a density of 0.449 g./cc. and is free of objectionable odor.

*Example 3*

The formation of a closed cell vinyl sponge from a polyvinyl chloride plastic is illustrated as follows:

Two samples (A and B) of a polyvinyl chloride plastic are compounded by blending the following ingredients on a paint mill. Sample B is out of the scope of this invention and is included for comparitive purposes only.

| | Parts by weight |
|---|---|
| Polyvinyl chloride plastisol grade (high molecular weight polymer sold as "Geon" 121 by B. F. Goodrich Chemical Company) | 100 |
| Dioctyl phthalate | 120 |
| Dibasic lead phosphite | 5 |
| Blowing agent, as shown in Table 2. | |

The plastisol is heated in a closed mold having a truncated cavity 4 in. x 2 in. x ¾ in. in dimensions (volume 80 ml.) fitted with a thermocouple and pressure gage. The mold is heated under pressure for 22

[1] The ammonium 5-azidotetrazole is diluted with 9.8 parts of silica flour before being added to the copolymer stock.

minutes with a pressure of 100–105 p.s.i.g. of steam on the platens. The mold is cooled to room temperature and the partially expanded cellular product is removed from the mold and heated for 20 minutes at 121° C.

For comparison, a foam is formed from Sample B using the readily available conventional blowing agent azodicarbonamide.

Table II shows the amounts of blowing agents used in each case and the densities of the foam samples.

TABLE II

| Blowing agent | Parts by weight | Density of sponge, g./cc. |
| --- | --- | --- |
| A. Ammonium azidotetrazole* | 10 | 0.099 |
| B. Azodicarbonamide | 20 | 0.090 |

*Added as 75% slurry in mineral oil.

From the above table it can be seen that 10 parts of ammonium azidotetrazole gives sponges having nearly the same density as those produced using twice as much azodicarbonamide.

As many widely different embodiments of this invention may be made without departing from the spirit and scope thereof, it is to be understood that this invention is not limited to the specific embodiments thereof except as defined in the apended claims.

What is claimed is:

1. A method for preparation of expanded cellular products from polymeric materials comprising the steps of intimately mixing an amount of ammonium 5-azidotetrazole with an organic polymer composition and heating the resultant mixture to a temperature sufficient to decompose the ammonium 5-azidotetrazole and expand the polymeric composition.

2. A method for preparation of expanded cellular products from organic polymeric materials comprising the steps of intimately mixing an amount of ammonium 5-azidotetrazole with an organic polymer composition and heating the resultant mixture to a temperature within the range of about 140 to 170° C. to decompose the ammonium 5-azidotetrazole and expand the polymeric composition.

3. A method for preparation of expanded cellular products comprising the steps of intimately mixing about 1 to 15 parts of amonium 5-azidotetrazole with about 100 parts of an elastomeric polymer composition and heating the resultant mixture to a temperature within the range of about 140 to 170° C. to decompose the ammonium 5-azidotetrazole and expand the elastomeric polymer.

4. A method for preparation of expanded cellular products comprising the steps of intimately mixing about 2 to 50 parts of ammonium 5-azidotetrazole with about 100 parts of an organic plastic polymer composition and heating the resultant mixture to a temperature within the range of about 140 to 170° C. to decompose the ammonium 5-azidotetrazole and expand the plastic polymer.

References Cited

UNITED STATES PATENTS

| | | | |
| --- | --- | --- | --- |
| 3,184,471 | 5/1965 | Harder | 260—2.5 |
| 3,184,472 | 5/1965 | Carboni | 260—2.5 |
| 3,192,170 | 6/1965 | Schmidt et al. | 260—2.5 |
| 3,258,468 | 6/1966 | Grotta et al. | 260—2.5 |

OTHER REFERENCES

"Annalen der Chemie," Justus Liebig, vol. 287, pp. 239–240 (1895).

MURRAY TILLMAN, *Primary Examiner.*

M. FOELAK, *Assistant Examiner.*

UNITED STATES PATENT OFFICE
CERTIFICATE OF CORRECTION

Patent No. 3,374,188                      March 19, 1968

Frank Dennis Marsh et al.

It is certified that error appears in the above identified patent and that said Letters Patent are hereby corrected as shown below:

Column 4, line 29, "14" should read -- 4 --; lines 32 and 33, cancel "Mooney viscosity, ML-4, Tire & Rubber Co." and insert -- ("Pliolite" S-6-B, Goodyear Tire & Rubber Co.) --; line 36, "Steric" should read -- Stearic --.

Signed and sealed this 19th day of August 1969.

(SEAL)
Attest:

Edward M. Fletcher, Jr.                        WILLIAM E. SCHUYLER, JR.
Attesting Officer                                        Commissioner of Patents